July 4, 1961 H. V. SMITH 2,990,714
APPARATUS AND METHOD FOR TESTING LIQUID SHRINKAGE
Filed Nov. 13, 1958
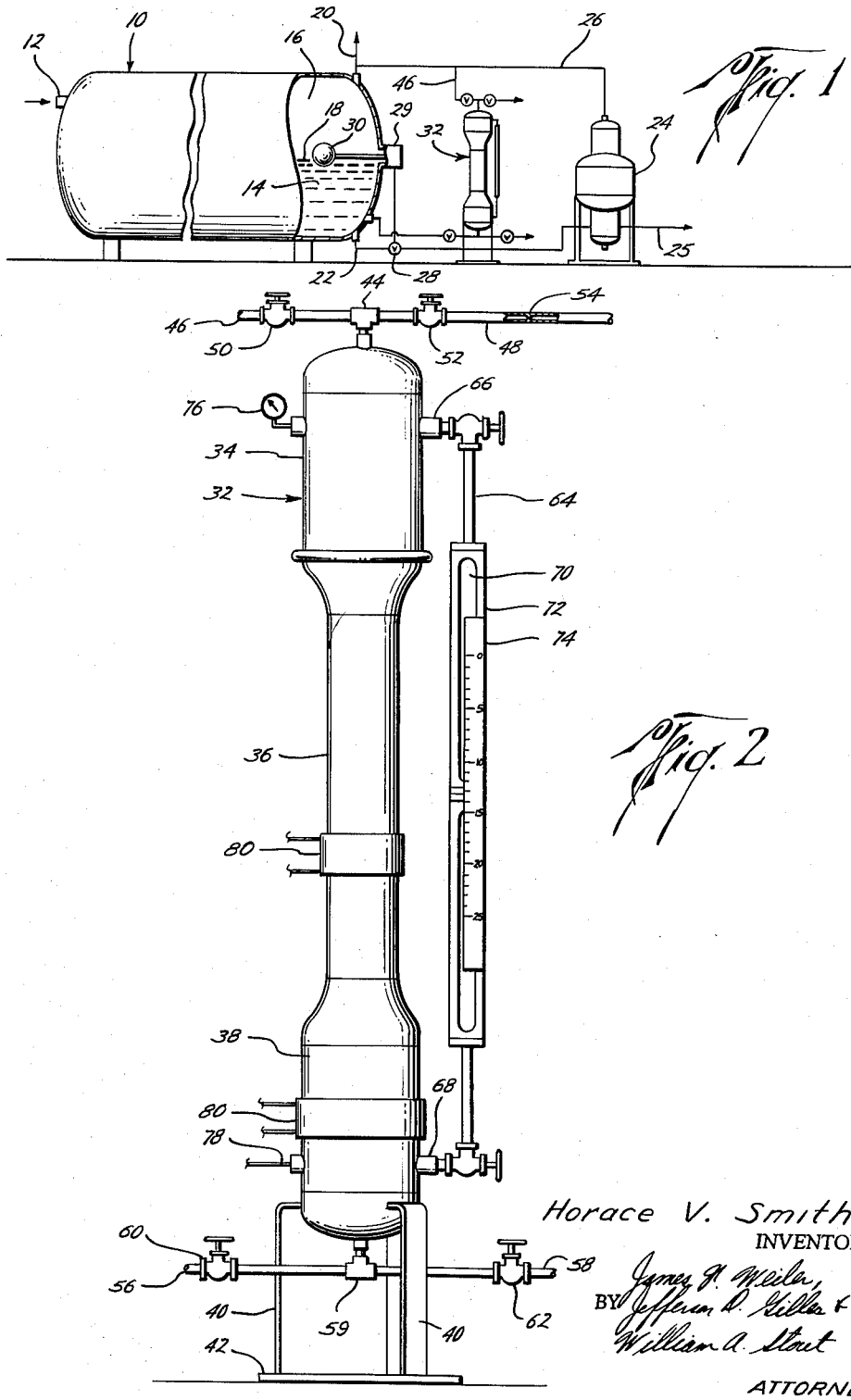
Horace V. Smith
INVENTOR.
ATTORNEYS United States Patent Office 2,990,714
Patented July 4, 1961

2,990,714
APPARATUS AND METHOD FOR TESTING LIQUID SHRINKAGE
Horace V. Smith, Houston, Tex., assignor to Oil Metering and Processing Equipment Corp., Harris County, Tex., a corporation of Texas
Filed Nov. 13, 1958, Ser. No. 773,707
9 Claims. (Cl. 73—53)

This invention relates to an apparatus and method for testing liquid shrinkage and more particularly relates to such an apparatus and method for determining the shrinkage in volume of liquid due to escaping gases and vapor when pressure on the liquid is reduced.

Many liquids when under pressure contain gases and/or condensed vapors that will escape from the liquid when pressure on the liquid is reduced resulting in a reduction in volume of the liquid after such reduction of pressure. For example, in crude oil flowing from oil wells under high pressures there is often gas which is not released until pressure on the crude oil is reduced. Likewise, in predominantly gas wells there is often produced distillate and/or condensate which include condensed vapors which will vaporize and reduce the volume of liquid when the pressure is reduced. This causes difficulty in the accurate metering of the volume of liquid produced by such wells.

It is conventional practice for oil well fluids from a well to be flowed into a separator under pressure of the same order as the well where the liquids are separated from the gases by gravity. From the separator the liquids flow to and through a meter where they are metered under the same pressure as the separator and then passed to a stock tank where they are stored under substantially atmospheric pressure with liquid from several other wells. It is often necessary to know the volume in the stock tank contributed by each of the wells. For example, where the wells are under separate ownership it is necessary to determine the amount contributed by each well or where for any of several reasons it is desired to test the flow of these wells. It is for these and other reasons that the liquids are metered prior to entering the stock tank. However, the volume recorded by the meters is not the same as the volume in the stock tank because the reduction of pressure on the liquids after they leave the meters permits gases and vapors in the liquids to escape thereby causing a volume shrinkage. One common way to determine this amount of shrinkage is to isolate all the wells but one from the stock tank and then compare the amount in the stock tank as shown by its gauge with the amount recorded by the meter and assume that for all flows thereafter the percentage of shrinkage will be the same. This has several obvious disadvantages. If the well conditions change this shrinkage does not remain constant. Additionally, the wells not being tested must have their flow stopped, or separate test facilities must be provided to isolate and test each well separately. This is particularly disadvantageous when flows are small so that it takes a considerable period to accumulate an appreciable volume or when the liquids are quite viscous. In the latter cse it sometimes requires as much as 48 hours for all the gases and vapors to escape from the liquid.

It is to overcome these disadvantages that the apparatus and method of the present invention are directed.

It is an object of the present invention to provide an apparatus and a method for determining shrinkage in volume of liquid due to the escape of vapors and gases from the liquid after pressure on the liquid has been reduced.

A further object of the present invention is to provide a method of determining subsequent shrinkage in volume of liquid under pressure in a vessel containing the liquid and a gas while maintaining such pressure in the vessel where the shrinkage is caused by a reduction of pressure on the liquid after it leaves the vessel.

Another object of the present invention is to provide the combination of a first vessel closed to the atmosphere and containing a layer of liquid and a layer of gas under pressure and a second closed vessel approximate the first vessel, said vessels being so interconnected, constructed and arranged that the second vessel determines the shrinkage which will occur on liquid in the first vessel after pressure on such liquid is reduced after leaving the first vessel.

A still further object of the present invention is to provide such a combination just mentioned in which the shrinkage in volume of the liquid may be easily and quickly determined at any time desired and at multiple stages of pressure reduction.

A still further object of the present invention is to provide such a combination which is economical to construct and operate and which is dependable in operation.

Other and further objects, features and advantages will be apparent from the following description of the presently preferred example of the invention, given for the purpose of disclosure and taken in conjunction with the accompanying drawings where like character references designate like parts throughout the several views and where FIGURE 1 is a partially diagrammatic side elevation of a separator or first vessel in combination with the second vessel of the invention and illustrating flow through a conventional meter, and FIGURE 2 is an enlarged side elevation of the second vessel of the combination of the present invention.

Referring now to FIGURE 1 there is illustrated a first vessel or separator 10 which receives under pressure at an inlet 12 well fluids consisting of liquids and gases with the liquids and gases separating by gravity into a layer of liquid 14 and a layer of gas 16 forming a gas-liquid interface 18. From the separator 10 through the gas outlet 20 the gases are allowed to pass under pressure such as to a gas gathering system not shown.

As the liquids are collected in the separator 10 they are allowed to flow from the separator 10 through the liquid meter line 22 and through a meter 24. The meter 24 is maintained under pressures of the same order as the separator 10 by the gas equalizing connection 26 so that liquid leaving the meter 24 by the line 25 may be moved by this pressure. The meter 24 may be of any preferred type such as that described and claimed in Patent No. 2,853,877 issued September 30, 1958, for a Rigid Buoyancy Mass Liquid Meter upon the application of Horace V. Smith.

To control the level of the gas-liquid interface 18 in the separator 10 so that gases will not enter the liquid meter line 22, a 2-way valve 28, which is opened and closed by a valve control assembly 29 including a float 30 in the separator 10, is placed in the liquid meter line 22. This valve control assembly 29 opens the valve 28 upon the gas-liquid interface 18 reaching a predetermined upper level and closes the valve 28 upon the gas-liquid interface 18 reaching a predetermined low level. Such a combination of the valve 28 and valve control assembly 29 is conventional. For example, a satisfactory valve control assembly and float are illustrated in Patent No. Re. 20,051, issued July 28, 1936, upon the application of J. P. Walker for an invention in Liquid and Gas Separation.

No further description of the meter 24 and the valve control assembly 29 and valve 28 are necessary as they are conventional and do not constitute the present invention. Any form of the first vessel 10 is satisfactory as long as it is closed to the atmosphere and is adapted to contain a layer of liquid and a layer of gas under pressure.

Referring now to both the drawings there is illustrated the second vessel 32 which is also closed to the atmosphere, is of general elongate upstanding configuration, and is located approximate the first vessel 10. The second vessel 32 includes a first or upper chamber 34 open to and aligned with a second or lower chamber 36 preferably having a substantially lesser horizontal dimension than the upper chamber 34. Formed at the bottom of the lower chamber 36 and open to said chamber 36 is a liquid reservoir 38 of larger cross-sectional dimension than the lower chamber 36. These chambers 34 and 36 and the reservoir 38 are preferably cylindrical for ease of construction and are secured to one another in any conventional manner such as by welding. The entire second vessel 32 is supported in any conventional means such as by the legs 40 welded at their upper ends to the liquid reservoir 38 and supported by a base plate 42.

The second vessel 32 is placed near the first vessel 10 at such a level that the lower chamber 36 in the second vessel 32 will always have a portion below the level of the gas-liquid interface 18 in the first vessel 10 so that liquid may flow, as hereinafter described, by gravity from the first vessel 10 into the lower chamber 36 of the second vessel 32.

Passage for gas into and out of the second vessel 32 is provided at the upper end of the first chamber 34 by a T connection 44 from one side of which extends the gas inlet line 46 and from the other side of which extends the gas outlet line 48. The gas inlet line is in communication with the gas layer in the first vessel such as through the gas equalizing connection 26 (FIGURE 1) and the flow of gas through this line 46 is controlled by a manually operated 2-way valve 50. In the gas outlet line is a manually operated 2-way valve 52 and downstream of said valve 52 is a restricted orifice 54 of lesser diameter than the gas outlet line 48 for a purpose which will be explained later. This gas outlet line 48, the valve 52, and the restricted orifice 54 form what may be called a gas exhaust element.

Liquids flow into and out of the second vessel 32 through the liquid inlet line 56 and the liquid outlet line 58 connected through a T connection 59 at the bottom of the liquid reservoir 38. The liquid inlet line 56 is in communication with the liquid layer 14 in the first vessel 10 and flow through this liquid inlet line 56 is controlled by a 2-way manually operated valve 60. Flow of liquid out the drain line 58 is controlled by a 2-way manually operated valve 62. This outlet line 58 and valve 62 are included in what may be termed a drain element.

A liquid level gauge 64 is secured to the second vessel 32 in communication with interior portions above and below the second chamber 36 by the connection 66 to the upper chamber 34 and the connection 68 to the liquid reservoir 38. This liquid level gauge 64 includes a framework 72 holding a reflex gauge glass 70 of sufficient strength to withstand pressures within the first and second vessels. Mounted on the framework 72 is an indicator scale 74 having indicia thereon reading directly in percentage of volume of liquid in the second vessel 32.

A gas pressure gauge 76 is attached to the first chamber 34 to indicate pressures therein and a thermometer 78 communicates with the liquid reservoir 38 to indicate temperatures of the liquids therein.

In operation of the combination and method of the present invention, the second vessel 32 is isolated from the first vessel 10 by closing the valves 50 and 60 when no shrinkage test is desired. When it is desired to make a shrinkage test the valve 60 in the liquid inlet line 56 is left closed, the valve 52 in the gas outlet line 48 is closed, the valve 62 in the liquid drain line 58 is partially opened, and the valve 50 in the gas inlet line 46 is then opened allowing gas under pressure from the first vessel 10 to enter through the gas inlet line 46 into the second vessel 32 and sweep out the lower end thereof through the liquid drain line 58 purging the second vessel 32 of gases foreign to that contained in the first vessel 10. The valve 62 in the liquid outlet line 58 is then closed allowing pressure in the second vessel 32 to build up equal to a pressure in the first vessel 10. During the build up of pressure in the second vessel 32 the pressure will not drop in the first vessel 10 because of the well fluids entering the inlet 12 into the first vessel 10. The valve 60 in the liquid inlet line 56 is then opened allowing liquid to flow by gravity into the second vessel 32 until the liquid level in the lower chamber 36 reaches the zero mark on the indicator scale 74 or reaches the level of the gas-liquid interface 18 in the first vessel 10, whichever first occurs. The valve 60 in the liquid inlet line 56 is then closed. After the liquid level in the lower chamber 36 becomes constant the valve 50 in the gas inlet line 46 is then closed isolating the second vessel 32 from the first vessel 10 with the liquids and gases in the second vessel 32 being under the same pressure as the liquids and gases in the first vessel 10.

The liquid level in the reflex gauge 70 at the indicator scale 74 is noted. The valve 52 in the gas outlet line 48 is then opened allowing the gas in the second vessel 32 above the liquid to escape to the atmosphere reducing the pressure on the liquid in the second vessel 32 to atmospheric. Thereafter gases and vapors formerly retained in the liquid by the pressure thus released will leave the liquid in the second vessel 32 and also pass out to the atmosphere through the gas outlet line 48. This escape of gases and vapors will cause a shrinkage in the liquid volume in the second vessel 32 and a consequent lowering of the liquid level in the second chamber 36 which will be followed by a corresponding lowering of the liquid level in the reflex gauge glass 70. After the liquids and gases in the second vessel 32 have come to equilibrium, that is there is no more net escape of gases and vapors from the liquid, the change of liquid level is noted on the indicator scale 74 directly in percentages of volume thereby giving the percentage reduction in volume of liquid in the first vessel 10 when pressure on liquid in the first vessel 10 is reduced to atmospheric after the liquid leaves the first vessel 10.

After the change in volume has been noted on the indicator scale 74, the valve 62 in the drain line 58 is opened allowing all liquid to be drained out and, if desired, this may be assisted by closing the valve 52 in the gas outlet line 48 and partially opening the valve 50 in the gas inlet line 46 allowing pressure from the first vessel 10 to force the liquid out the drain line 58. When the second vessel 32 is drained of liquid all valves 46, 52, 60, and 62 are again closed and the apparatus is ready for a subsequent test as desired.

Because the liquid reservoir 38 is of larger horizontal dimensions than the second chamber 36, the second vessel 32 may contain a larger sample of liquid without increasing the height of the vessel 32 than would be true if the horizontal dimensions of the second chamber were carried to the bottom of the second vessel 32. The reduction of cross-sectional dimensions in the second chamber 36 in which the upper and lower liquid levels are maintained results in a greater vertical change of liquid level for a given change of volume than if the second chamber 36 were of the same diameter as the liquid reservoir 38. The larger cross-sectional dimensions of the upper chamber 34 and the restricted orifice 54 in the gas outlet line 48 reduce the velocity of escaping gases and vapors from liquid in the lower chamber 36 and prevent entrainment of liquids with the escaping gases and vapors when the valve 52 in the gas outlet line 48 is first opened. The restricted orifice 54 may be omitted but in such instance careful control of the opening of the valve 52 is required to prevent entrainment.

As liquid leaving the first vessel 10, after flowing through the meter 24, may pass through several stages of treatment before reaching atmospheric pressure and as the pressure on the liquid in each of these stages of treatment may be different, it is often desirable to know the percentage of shrinkage in volume at these various stages of treatment. For example, the pressure in the first vessel 10, which is a first stage of treatment, may be 1200, at a second stage of treatment 800, at a third stage of treatment 400, and at a fourth stage of treatment zero p.s.i. gauge. The present invention may be used to determine the percentage of shrinkage in volume at the pressures at each of such multiple stages. This is accomplished by the same sequence of steps of operation as previously described when testing at a reduction to atmospheric pressure except the pressure in the second vessel, as indicated by the pressure gauge 76, is first reduced, through operation of the valve 52 in the gas outlet line 48, to only 800 p.s.i. instead of atmospheric and the percentage of shrinkage is then noted. Thereafter the valve 52 is opened until the pressure in the second vessel 32 drops to 400 at which time the valve 52 is closed and the shrinkage noted. This is repeated for the pressure at each stage at which it is desired to know the shrinkage.

Because the treatment at one of such multiple stages may be at more elevated temperatures than the temperature of the liquid in the first vessel 10, the temperature of the liquid in the second vessel 32 may be raised to the temperature of such later stage of treatment by means of heating elements 80 of any conventional type such as the electrical heating elements indicated.

The foregoing description also describes the method which method in general is that of determining shrinkage in a volume of liquid under pressure in a vessel containing said liquid and a gas while maintaining such pressure in the vessel. The method includes flowing a portion of the gas from the vessel into a closed second vessel until the gas pressures in the vessels are equal, flowing a sample of the liquid in the first vessel into a portion of the second vessel while maintaining equal pressures in both vessels, isolating the vessels from each other, exhausting at least a portion of the gas from the second vessel, and measuring the loss of volume of liquid in the second vessel caused by exhausting the gas.

While the present invention has been described in connection with measuring the shrinkage of oil well fluids and in connection with a separator, it will be understood that the invention may be used with any types of liquid under pressure which have a shrinkage due to escaping gases or vapors upon a reduction of pressure on the liquids.

The present invention, therefore, is well suited to carry out the objects and attain the advantages and ends mentioned as well as others inherent therein. Accordingly, the invention is to be limited only by the spirit thereof and the scope of the appended claims.

What is claimed is:

1. In combination, a first vessel closed to the atmosphere, said vessel adapted to contain a layer of liquid and a layer of gas under pressure forming a gas-liquid interface, a closed second vessel approximate the first vessel, said second vessel having a portion at a lower level than the gas-liquid interface in the first vessel, a gas inlet line between the gas layer in the first vessel and an upper portion of the second vessel, a liquid inlet line between the liquid layer in the first vessel and the second vessel at a point at a lower level than the gas-liquid interface in the first vessel, a gas exhaust element in an upper portion of the second vessel, a drain element in the second vessel at its lowest portion, a separately operable valve in each said line, exhaust element, and drain element, and a liquid level gauge in communication with the interior of the second vessel at two vertically spaced points, one of said spaced points being below the level of the gas-liquid interface in the first vessel, said liquid level gauge including means indicating a gas liquid interface level in the second vessel.

2. The combination of claim 1 including a restricted orifice in the exhaust element.

3. The combination of claim 1 including a pressure gauge associated with the second vessel and adapted to indicate pressure in an upper portion of said second vessel.

4. In combination, a first vessel closed to the atmosphere, said vessel adapted to contain a layer of liquid and a layer of gas under pressure forming a gas-liquid interface, a closed second vessel approximate the first vessel, said second vessel having an upper chamber and a lower upstanding chamber open to the upper chamber, said lower chamber being of substantially lesser horizontal dimension than the upper chamber and having a portion at a lower level than the gas-liquid interface in the first vessel, a gas inlet line between the gas layer in the first vessel and an upper portion of the second vessel, a liquid inlet line between the liquid layer in the first vessel and a point on the second vessel at a lower level than the gas-liquid interface in the first vessel, a gas exhaust element in communication with the upper chamber in the second vessel, a drain element in the second vessel at its lowest point, a separately operable valve in each said line, exhaust element, and drain element, and a liquid level gauge in communication with the interior of the second vessel at two vertically spaced points, one of said spaced points being below the level of the gas-liquid interface in the first vessel, said liquid level gauge including means indicating a gas-liquid interface level in the second vessel.

5. The combination of claim 4 including a restricted orifice in the exhaust element.

6. The combination of claim 4 including in the second vessel a liquid reservoir below and open to the lower chamber, said liquid reservoir being of substantially greater horizontal dimension than the lower chamber.

7. A method of determining shrinkage in volume of liquid under pressure in a vessel containing said liquid and a gas while maintaining such pressure where the shrinkage is caused by a reduction in pressure on the liquid after it leaves the vessel, said method comprising flowing a portion of the gas in the vessel into a closed second vessel until the gas pressures in the vessels are equal, flowing a sample of the liquid into a portion of the second vessel while maintaining equal pressures in both vessels, isolating the vessels from each other, exhausting at least a portion of the gas from the second vessel, and measuring the loss of volume of liquid in the second vessel caused by exhausting the gas.

8. The method of claim 7 in which the sample of the liquid flowing into a portion of the second vessel flows by gravity.

9. The method of claim 7 including the step of heating the liquid in the second vessel.

References Cited in the file of this patent

UNITED STATES PATENTS

| | | |
|---|---|---|
| 2,736,190 | Bockelmann et al. | Feb. 28, 1956 |
| 2,823,540 | Patch | Feb. 18, 1958 |
| 2,853,877 | Smith | Sept. 30, 1958 |